Jan. 16, 1923. 1,442,717
H. FRAPPART.
CALIPERS.
FILED JUNE 28, 1920. 2 SHEETS-SHEET 1

Inventor
Henry Frappart
By Lloyd W. Patch
his Attorney

Jan. 16, 1923.
H. FRAPPART.
CALIPERS.
FILED JUNE 28, 1920.
1,442,717
2 SHEETS-SHEET 2
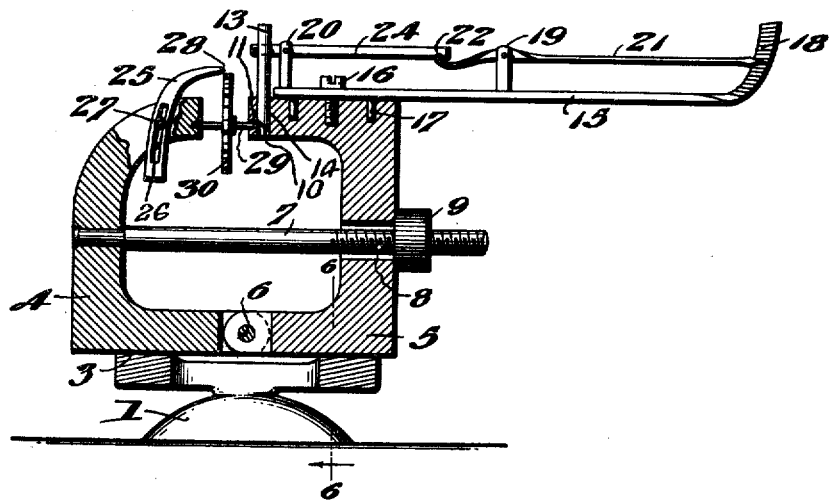
Fig. 4.
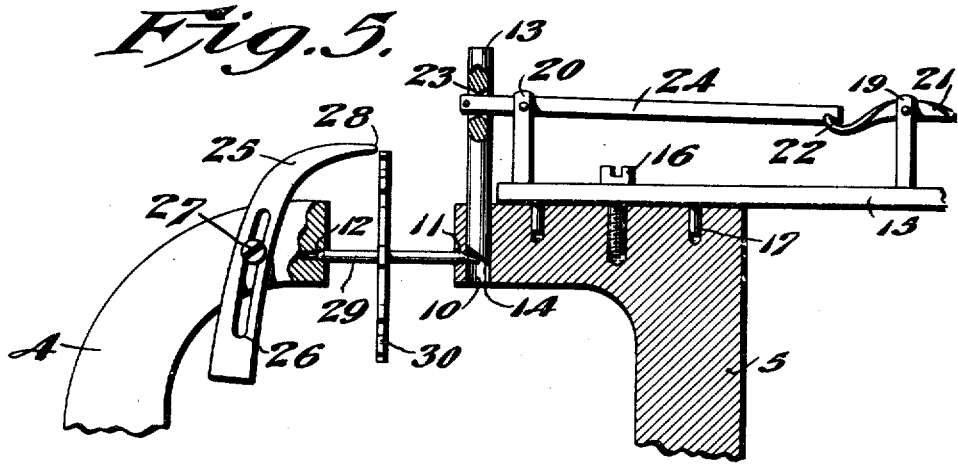
Fig. 5.
Fig. 6.
Inventor
Henry Frappart
By Lloyd W. Patch
his Attorney Patented Jan. 16, 1923.

1,442,717

UNITED STATES PATENT OFFICE.

HENRY FRAPPART, OF KINCAID, ILLINOIS.

CALIPERS.

Application filed June 28, 1920. Serial No. 392,196.

*To all whom it may concern:*

Be it known that HENRY FRAPPART, citizen of the United States, residing at Kincaid, in the county of Christian and State of Illinois, has invented certain new and useful Improvements in Calipers, of which the following is a specification.

My present invention pertains to calipers, and particularly to a so called wheel thrower and pivot straightener for use in straightening balance wheels of watches and truing the pivots when they are bent.

An object of this invention is to provide a caliper for truing, poising, pivot testing and straightening, which is adjustable for different lengths of pivots and different sizes of balance wheels, and which will function with maximum efficiency and accuracy in testing and straightening various types of watch pivots and balance wheels.

A further object resides in so constructing the indicating means of the caliper that it is possessed of great sensitiveness, thus making it possible to secure a fine degree of accuracy in straightening a pivot.

Yet another object is to arrange the balance wheel testing means so that the balance may be straightened at the same time the pivot is being trued.

With these and other objects in view, which will be apparent from the specification, drawings, and claims, this invention includes certain novel features of construction and combinations of parts which will now be set forth.

In the drawings:

Fig. 4 is a view similar to Fig. 1 with the body portion shown in vertical section and with a watch balance fitted in place.

Fig. 5 is an enlarged fragmentary detail view of the upper portion of the structure shown in Fig. 4 disclosing the placement of a balance having a bent pivot.

Fig. 6 is a detail sectional view substantially on line 6—6 of Fig. 4.

Figure 1:
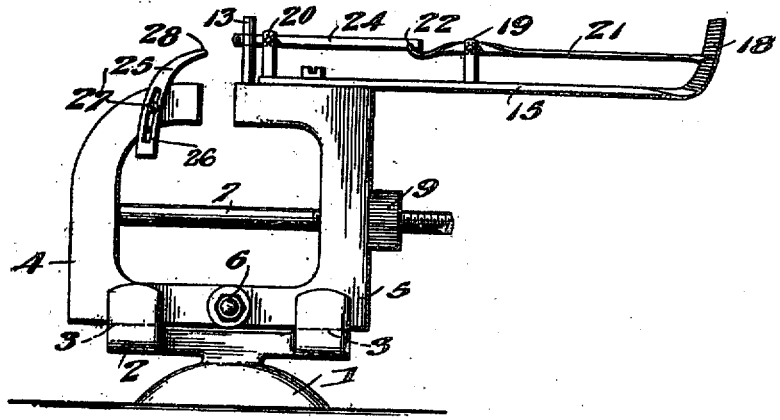
Figure 1 is a view in side elevation of the preferred embodiment of my invention.
Figure 2:
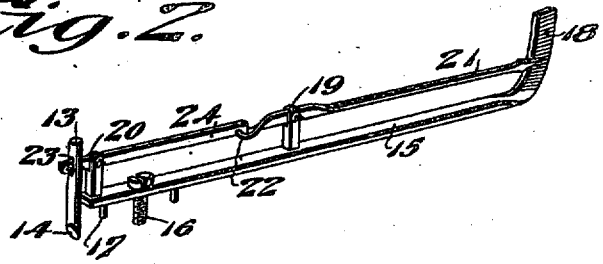
Fig. 2 is a perspective view showing the indicating means detached to better disclose the construction thereof.

The device of my invention is intended for use by watchmakers, repairmen, and the like; and is so constructed that watch balance and pivot assemblies of different styles and sizes can be fitted for testing and truing and the parts of the caliper can be adjusted for the particular mechanism under test.

A base member 1 which is of a size and construction to give a firm footing and support for the caliper, has posts 2 at the ends thereof which are provided with recesses 3.

Body members 4 and 5, which are of substantially U-shaped form and each provided with a bearing portion on one end, are hingedly connected together by hinge pin 6. The free ends of the body members are shortened sufficiently to leave a space therebetween when the hingedly connected ends are brought to a position of alinement, and an adjusting screw 7 connected with member 4 has its threaded end passed loosely through opening 8 in body member 5. A thumb nut 9 is turned onto the threaded end to bear against member 5 and to adjust the width of opening between the free ends of the body members. The assembly of the parts is such that the arms of the body members 4 and 5 are disposed to be substantially horizontal, and in use these members are fitted in recesses 3 of the posts 2 of the base member to support the structure and insure that this position will be maintained.

The free end of body member 5 has a bearing opening 10 bored vertically closely adjacent its extremity and a pivot bearing opening 11 bored in the end of this arm opens into bearing opening 10 at right angles. A pivot bearing opening 12 is provided in the free end of body member 4 substantially in alinement with bearing opening 11. A plunger 13 is fitted to slide freely within bearing opening 10 and has its end 14 which is received within the opening cut diagonally across.

A supporting bar 15 is connected in a horizontal position on the free arm of body member 5 by a screw 16 and is held against turning or shifting by pins 17 which are received in appropriate openings provided in the body member. At its free end this supporting bar has an upstanding arm 18 which is graduated. A bearing standard 19 is provided in the middle portion of supporting bar 15 and a second bearing standard 20 is provided at the inner end of bar 15. An indicating needle or hand 21 is given swinging mounting in bearing standard 19 with one end adjacent the graduations on arm 18, and the remaining end of this needle or hand is provided with a bearing fork or rest 22. Plunger 13 has an opening 23 therethrough and a motion increasing lever 24 pivoted in bearing standard 20 has one end passed through this opening 23 and the remaining end received in the bearing fork 22 of needle or hand 21.

A gauge member 25 has an elongated slotted opening 26 in the body thereof and a set screw 27 is passed through this opening and is turned into a threaded bore provided adjacent the end of the free arm of body member 4. This gauge member is curved at one end and is reduced to provide a gauge point 28.

In the use of my improved caliper, with the parts assembled substantially as shown in Fig. 1, thumb nut 9 is turned to permit the free ends of body members 4 and 5 to spread sufficiently that the pivot of a watch balance can be fitted with ends of the pivot 29 in the bearing openings 11 and 12 and the balance wheel 30 spaced therebetween. Plunger 13 is raised sufficiently that the diagonal face thereof rests on the pivot point projecting into bearing opening 10 through pivot bearing opening 11, and thumb nut 9 is tightened to secure a proper bearing upon pivot 29. Gauge member 25 is adjusted to bring indicating point 28 to a position adjacent the rim of balance wheel 30. Assuming the wheel is to be trued as the balance wheel is turned any lack of trueness in the poise of the balance wheel will be readily discernible through the variations with respect to the point 28 of gauge member 25, and the wheel can be readily poised. Where the pivot is bent, as shown in Fig. 5, this will be shown by fluctuation of needle or hand 21 adjacent the graduations on arm 18. This movement of needle 21 is brought about through the fact that plunger 13, freely slidable in bearing opening 10, is supported with its diagonal face resting on the point of pivot 29. Any swing or movement of the pivot point from a true axis will cause vertical movement of plunger 13 and consequent swinging of lever 24. Through this lever the motion imparted to needle or hand 21 is greatly increased over the rising and falling movement of plunger 13, and even the slightest lack of trueness on the pivot point will thus be indicated by the needle wavering adjacent the graduations.

Figure 3:
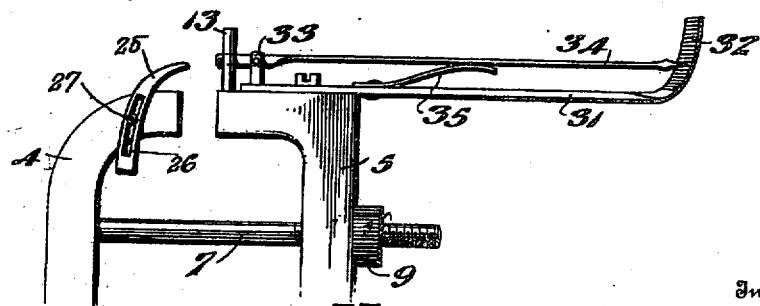
Fig. 3 is a side elevational view showing the adaptation of a modified form of the indicating means.

In the modified construction shown in Fig. 3, the body members 4 and 5 are of the form described and plunger 13 is fitted as above outlined. The supporting bar 31 has an upturned arm 32 similar to arm 18, which is also graduated. This supporting bar 31 is mounted on body member 5, and has a bearing standard 33 adjacent its inner end. An indicating needle or hand 34 is pivoted in this bearing standard 33 and has one end fitted through the opening in plunger 13, the remaining end being extended to swing or move adjacent the graduations on arm 32. A leaf spring 35 secured on supporting bar 31 bears beneath needle or hand 34, this spring having only sufficient strength to bear up the needle and not being intended to influence or resist movement thereof.

The use of this modified form of my invention is substantially the same as with the preferred embodiment, the balance wheel assembly being fitted and tested in substantially the same manner. However, with this adaptation motion is imparted directly through plunger 13 to the hand 34.

While, in the foregoing, I have described specific embodiments, and have mentioned only certain possible modifications, it will be appreciated that in practice I do not limit myself to such specific details as herein set forth, but may resort to any practical modifications falling within the scope of the invention as defined in the appended claims.

I claim:

1. A caliper for use in straightening and poising a balance wheel and pivot assembly having bearing portions at its ends, said caliper including a pair of body members between which said pivot is revolubly mounted, a plunger in contact with one of the bearings of said pivot mounted to be moved by the swing of said point when the pivot is bent, and indicating means to show movement of said plunger.

2. A caliper for use in straightening and poising a balance wheel and pivot assembly having bearing portions at its ends, said caliper including a pair of body members between which said pivot is revolubly mounted, a plunger in contact with one of the ends of said pivot mounted to be moved by the swing of said point when the pivot is bent, and means associated with said plunger to show movement thereof and to indicate the degree and direction of bend of the pivot.

3. A caliper for use in straightening and poising a balance wheel and pivot assembly having bearing portions at its ends, said caliper including a pair of body members between which said pivot is revolubly mounted, a plunger in contact with one of the bearings of said pivot mounted to be moved by the swing of said point when the pivot is bent, indicating means to show movement of said plunger, and gauge means adjustably mounted on one of the body members and extending adjacent one side of the balance wheel.

4. A caliper for use in straightening a watch pivot having bearing portions at its ends, said caliper including means to support said pivot to be capable of revolution on a horizontal axis, said means having a vertical opening adjacent one of the bearing portions, a vertically disposed plunger slidably mounted in said opening and resting on one of the bearings of said pivot to be moved by the swinging of said bearing as the pivot is revolved if the same be bent, and a hand actuated by movement of said plunger to indicate the degree and direction of bend of the pivot.

5. A caliper for use in straightening watch pivots, said caliper including a pair of substantially U-shaped body members hingedly connected together with two of their arms in horizontal alinement, said body members having horizontally alined pivot bearing openings in the ends thereof and one of said members being provided with a vertically formed bearing opening with which the pivot bearing opening communicates, an adjusting screw by which said body members are moved to adjust to and revolubly mount different lengths of pivots in said pivot bearing openings, a plunger having its lower end cut to a diagonal face slidably mounted in the vertical bearing opening with its diagonal face bearing upon the pivot point projecting into said vertical opening through the communicating pivot bearing opening, the arrangement of the parts being such that as the point of a bent pivot swings in contact with the plunger this plunger will be moved, and means to visibly indicate the degree and direction of movement of said plunger.

6. A caliper for use in straightening watch pivots, said caliper including a pair of substantially U-shaped body members hingedly connected together with two of their arms in horizontal alinement, said body members having horizontally alined pivot bearing openings in the ends thereof and one of said members being provided with a vertically formed bearing opening with which the pivot bearing opening communicates, an adjusting screw by which said body members are moved to adjust to and revolubly mount different lengths of pivots in said pivot bearing openings, a plunger having its lower end cut to a diagonal face slidably mounted in the vertical bearing opening with its diagonal face bearing upon the pivot point projecting into said vertical opening through the communicating pivot bearing opening, the arrangement of the parts being such that as the point of a bent pivot swings in contact with the plunger this plunger will be moved, a supporting bar mounted on the body member carrying said plunger provided with an arm on its outer end having graduation markings thereon, a hand mounted on said supporting bar with its end adjacent the graduations, and motion increasing means associated with said plunger and with the hand to actuate the same to give visible indications of the movement of said plunger.

7. A caliper for use in straightening and poising watch balance wheel and pivot assemblies, said caliper including a supporting base having a standard thereon, a pair of substantially U-shaped body members mounted on said standard and hingedly connected together with one arm of each member in horizontal alinement with an arm of the remaining member, the ends of said alined arms being provided with pivot bearing openings and one arm having a vertical bearing opening adjacent its extremity with which the pivot bearing opening of said arm communicates, an adjusting screw by which said body members are adjusted to hold and revolubly mount a balance pivot, a plunger having one end faced diagonally, mounted slidably in the vertical bearing opening with the diagonal face resting on the pivot point received in the communicating pivot bearing opening, a supporting bar connected on the body member carrying said plunger provided with a graduated arm at its outer end, a hand movably mounted on said supporting bar with one end adjacent the graduated arm and the remaining end connected to receive movement from said plunger, and a gauge member mounted on the remaining body member settable to bring an indicating point adjacent the balance wheel.

In testimony whereof I affix my signature.

HENRY FRAPPART.